Figure 1:
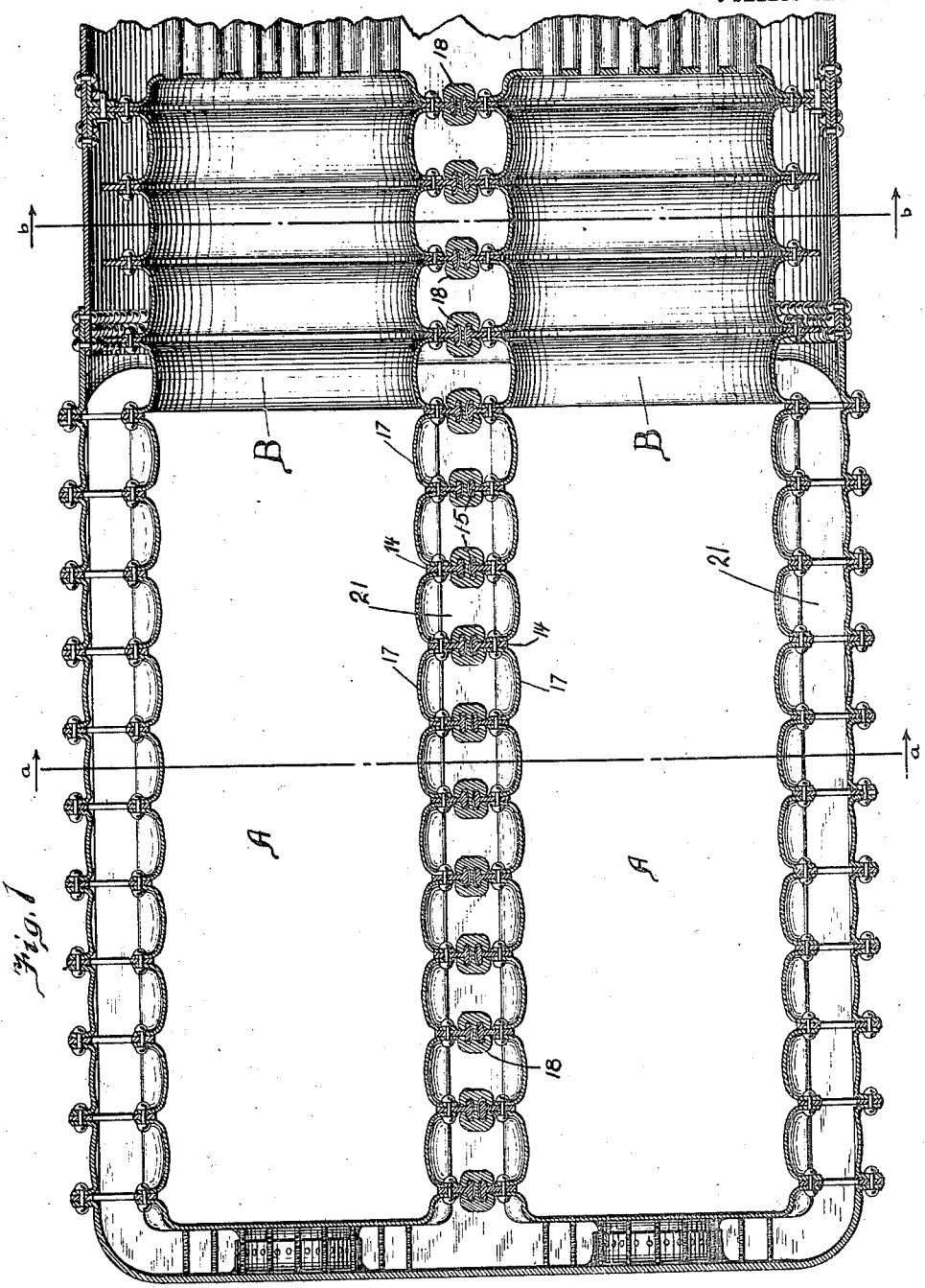

F. M. JACOBS.
MEANS FOR STAYING SECTIONAL WALLS.
APPLICATION FILED JUNE 5, 1913.

1,093,428.

Patented Apr. 14, 1914.
5 SHEETS—SHEET 1.

Witnesses
R. E. Wighton.
N. C. Brown.

Inventor
Frank M. Jacobs,
by Heideman Street
Attorneys

F. M. JACOBS.
MEANS FOR STAYING SECTIONAL WALLS.
APPLICATION FILED JUNE 5, 1913.

1,093,428.

Patented Apr. 14, 1914.
5 SHEETS—SHEET 3.

F. M. JACOBS.
MEANS FOR STAYING SECTIONAL WALLS.
APPLICATION FILED JUNE 5, 1913.
1,093,428. Patented Apr. 14, 1914.
5 SHEETS—SHEET 4.
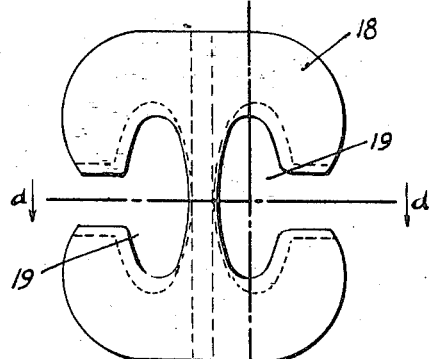
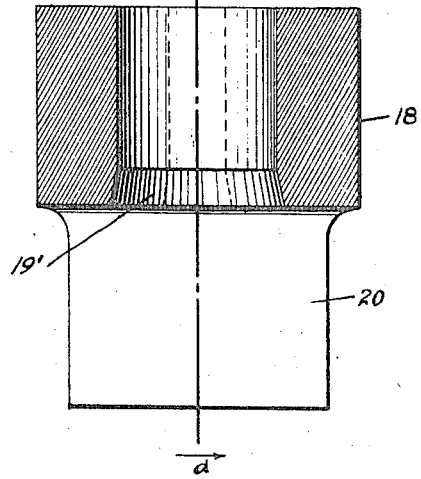
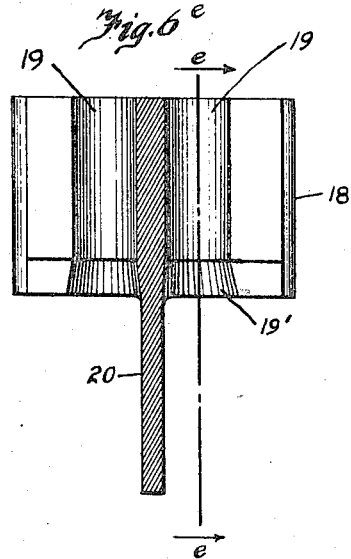
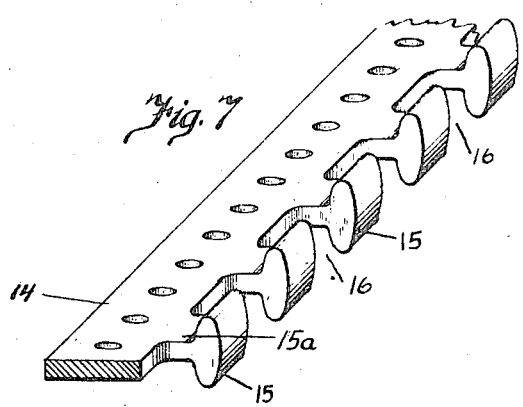
Witnesses
R. E. Wighton
H. E. Brown
Inventor
Frank M. Jacobs,
By Heideman Street
Attorneys F. M. JACOBS.
MEANS FOR STAYING SECTIONAL WALLS.
APPLICATION FILED JUNE 5, 1913.
1,093,428.
Patented Apr. 14, 1914.
5 SHEETS—SHEET 5.
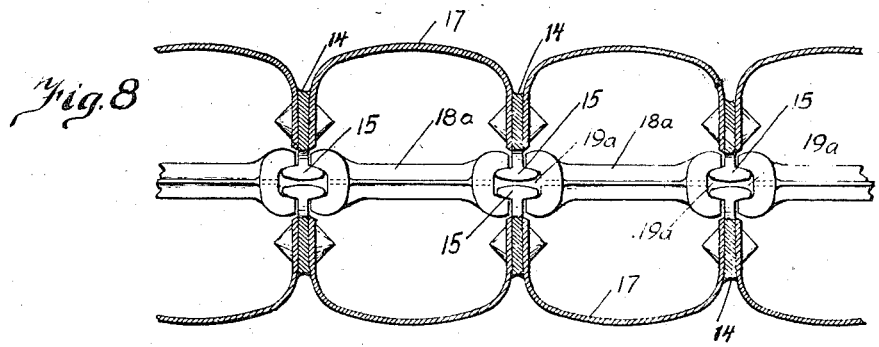
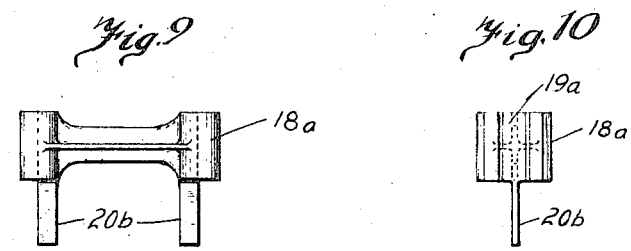 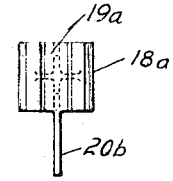
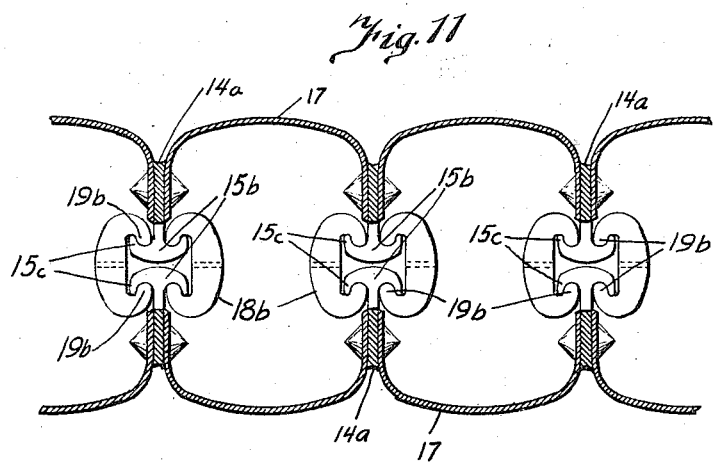
 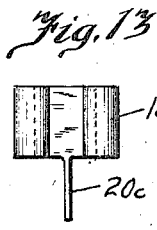
Witnesses
R. E. Wighton
N. L. Brown
Inventor
Frank M. Jacobs
by Heideman Streit
Attorneys

UNITED STATES PATENT OFFICE.

FRANK M. JACOBS, OF TOPEKA, KANSAS

MEANS FOR STAYING SECTIONAL WALLS.

1,093,428.  Specification of Letters Patent.  Patented Apr. 14, 1914.

Application filed June 5, 1913. Serial No. 771,914.

*To all whom it may concern:*

Be it known that I, FRANK M. JACOBS, a citizen of the United States, and resident of Topeka, in the county of Shawnee and State of Kansas, have invented certain new and useful Improvements in Means for Staying Sectional Walls, of which the following is a description, reference being had to the accompanying drawings, which form a part of my specification.

My invention relates to means whereby adjacently placed walls, composed of a number of units or sections, so arranged as to provide an intervening chamber or chambers adapted to receive a fluid or liquid under pressure, will be properly supported or stayed.

My invention is more especially adapted for use in connection with sectional furnaces or sectional combustion chambers of steam boilers wherein the furnaces or combustion chambers are so arranged as to provide an intermediate water chamber or leg.

The object of the invention is the provision of means whereby the necessity of employing stay members or sheets secured in place by means of the usual rivets, which are exposed to the flame or hot gases, will be entirely obviated.

The invention is more particularly adapted for use in connection with steam boilers provided with sectional furnaces or sectional combustion chambers arranged in pairs and parallel with each other so as to provide an intermediate or inside water-leg. It is evident that with a steam boiler so constructed, it is impossible to rivet a one-piece stay-sheet in the sectional inside water-leg so as to present the rivets within the water-leg where they will not be exposed to the flame or hot gases of the furnace and combustion chamber portions. It is to overcome this serious objection, and at the same time provide staying means possessing a flexibility not attained by the use of a one-piece stay sheet, as well as a number of other advantages, that I have devised the means hereinafter to be described.

Figure 2:
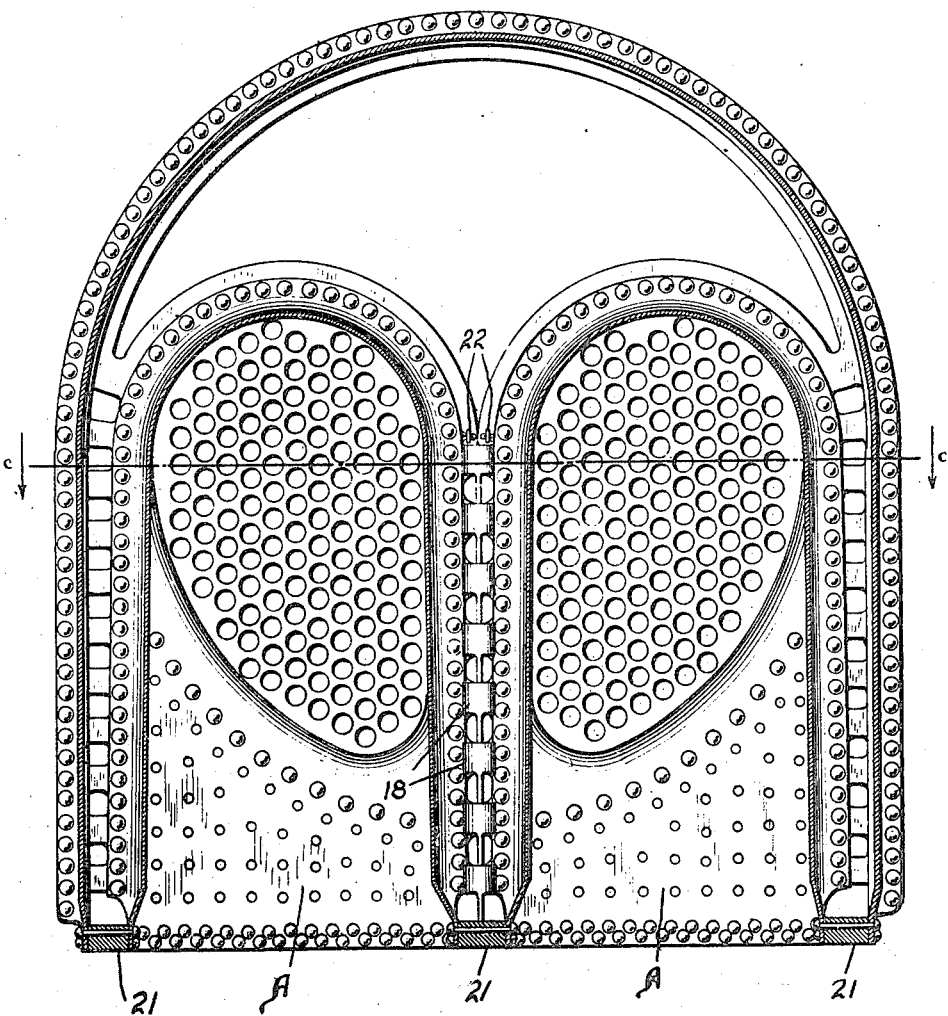
Figure 3:
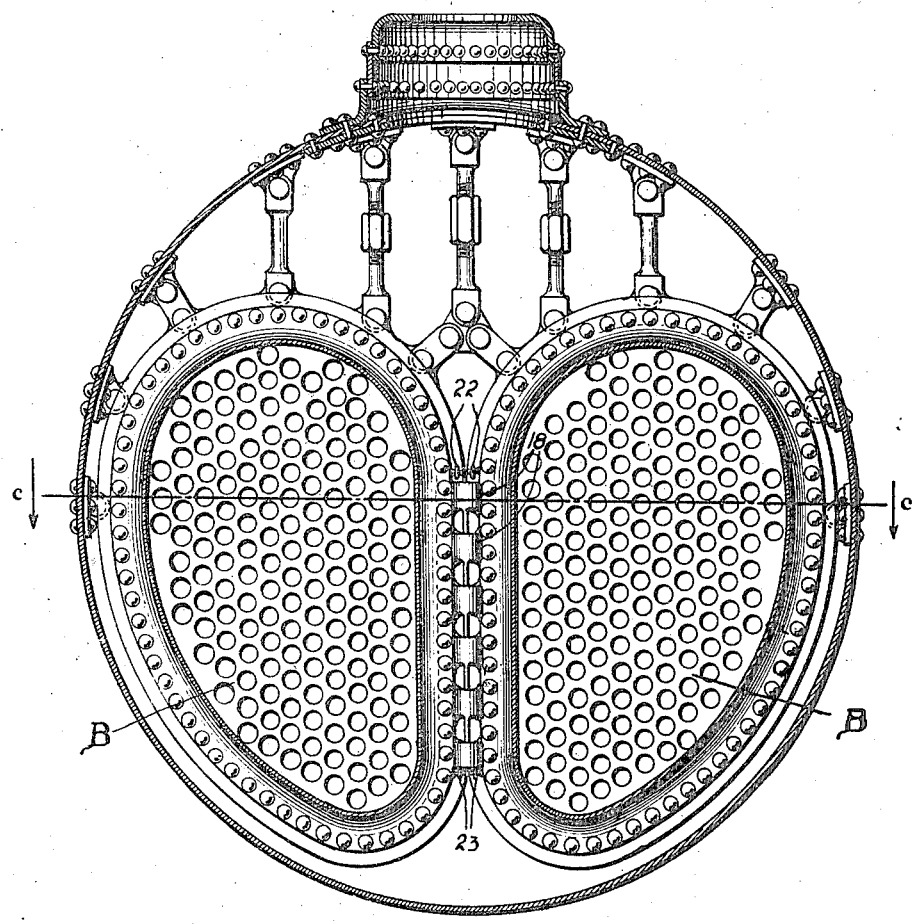

In the drawings:—Figure 1 is a longitudinal sectional plan view of the firebox end of a locomotive type of boiler, shown equipped with two Jacobs-Shupert sectional fireboxes, and two Jacobs self-supporting sectional combustion chambers; the adjacent wall of the furnaces and combustion chambers being shown secured or stayed together by one form of my improved means; the view being taken on the line *c—c* of Figs. 2 and 3; the arrows indicating the direction in which the section is observed. Fig. 2 is a transverse sectional view of the boiler illustrated in Fig. 1 and taken on the line *a—a* looking in the direction of the arrows. Fig. 3 is a transverse sectional view taken through the combustion chambers on the line *b—b* of Fig. 1 and looking in the direction of the arrows. Fig. 4 is a plan view of one form of my improved staying means; being the construction employed in connection with the sectional furnaces and sectional combustion chambers illustrated in Figs. 1, 2, and 3. Fig. 5 is a sectional view taken on the line *e—e* of Fig. 4 and looking in the direction of the arrows. Fig. 6 is a sectional view taken on the line *d—d* of Fig. 4 and looking in the direction of the arrows. Fig. 7 is a perspective view of a portion of a form of stay-sheet used in connection with my improved means. Fig. 8 is a longitudinal sectional plan view of a portion of an inside water-leg of a sectional firebox, showing a modified form of my invention and its method of application. Fig. 9 is a side elevation of the modified form of staying means shown in Fig. 8. Fig. 10 is an end elevation of the same. Fig. 11 is a sectional plan view of a portion of an inside water-leg of a firebox, illustrating another modified form of my invention. Fig. 12 is a side elevation of the modified form of staying means shown in Fig. 11. Fig. 13 is an end elevation of the same.

I have illustrated my invention in connection with sectional furnaces and combustion chambers of the locomotive type of steam boiler, wherein the boiler is shown provided with two furnaces and two combustion chambers arranged with their longitudinal axes parallel to each other and separated by an intermediate or inside water-leg.

The exemplification of my invention illustrates its application to a locomotive type of boiler equipped with two Jacobs-Shupert sectional fireboxes and two Jacobs self-supporting sectional combustion chambers at present well known in the art, the fireboxes and combustion chambers being arranged parallel with each other, and longitudinally of the boiler as very clearly shown in Figs. 1, 2, and 3 of the drawings; the firebox end of the boiler being shown provided with an outside shell composed of different units or sections, while the combustion chamber end of the boiler is shown provided with the usual outside boiler shell.

As the manner of forming the furnace portions and combustion chamber portions, as well as the outer boiler-shell, and the method of securing the sections together, form no part of my invention, a detailed description of this portion of the boiler, as illustrated in the drawings, need not be entered into.

My improved staying means comprises a stay-sheet or member 14 provided with a plurality of projections or heads 15, more clearly illustrated in Fig. 7, and provided with the intermediate cut-out or water-circulating portions as shown at 16, see Fig. 7. These stay-sheets 14 may be of any length to correspond with the length or height of the walls intended to be secured together; the stay-sheet or strip 14 being intended to be riveted between the flanged portions of adjacently placed sections 17, which constitute the walls to be supported or stayed.

In the exemplification, the units or sections 17 constitute the wall of the two furnaces A, A, and the walls of two combustion chambers B, B; and it is between the adjacent parallelly arranged walls of the furnace portion and combustion chamber portion, that my invention is intended to be used. The stay sheets or members 14 are so secured between the adjacent sections that the heads 15 of the members 14 secured to opposing walls will be presented toward and directly opposite each other, as very clearly shown in Fig. 1. The oppositely disposed stay-sheets 14 are linked or connected together by the stay members or stay links 18. The preferred form of stay member or link is shown in Fig. 4, and is provided with the oppositely disposed recesses 19, 19, of a contour similar to the cross section of the heads 15 of the stay sheets 14; the outer end of recesses 19 being restricted to receive the connecting or neck portions 15ª of the stay-sheet and thus prevent the lateral withdrawal of head portions 15. The portion of the connecting member or link 18 intermediate of the oppositely disposed recesses 19, 19, is made to terminate in a depending spacing web or plate portion 20, which is preferably of the same length as the distance or space between the successive heads 15 of the stay sheet or member 14. The function of the web or plate portion 20 of the connecting links or members 18 is to separate or space the successive connecting members or links 18 at distances corresponding with the distance between the successive heads 15, so as to provide for the circulation of the water. The ends of the recesses 19, 19, namely the ends on the sides of the connecting members or links 18 on which the spacing portion 20 is formed, are preferably tapered as very clearly shown in Figs. 5 and 6 at 19', so as to guide the heads 15 of the stay sheets 14 into the recesses 19 and thus insure the proper seating of the connecting member 18.

It will be understood, of course, that as many connecting members or links 18 are employed as there are heads on the stay sheets or members 14; and in practice where my invention is used in connection with a boiler of the class illustrated in the drawings, with the walls of the furnace portions constituting the inside water-leg of the boiler, the connecting links or members 18 are placed so as to present the spacing portions 20 downwardly, as very clearly shown in Fig. 2, so that the spacing portion 20 of the bottom connecting member or link 18 will rest upon the mud ring 21; while the spacing portion or plate 20 of the different links or members above will rest upon the link immediately beneath, as very clearly shown in Fig. 2. The uppermost connecting member or link 18 may be held in place against vertical displacement in any suitable manner, as for example by the keys 22 which are shown inserted in a continuation of stay member or sheet 14 at a point above the uppermost member or link 18.

In the intermediate or inside water-leg between the adjacently placed combustion chambers, as illustrated in Fig. 3, I show the bottom connecting member or link 18 held in place by the keys 23; the connecting link or member 18 in this instance need not be provided with the spacing portion or plate 20. With the top and bottom links or members 18 thus securely fastened or held in place, it is evident that the intermediate links or connecting members will also be held in position by means of the respective spacing portions or plates 20.

As very clearly shown in Figs. 2 and 3, I prefer to provide a small clearance between the keys or securing members 22 and the topmost link or connecting member 18, so as to permit the opposite walls of the water-leg to have independent vertical expansion.

In Figs. 8, 9, and 10, I show a modified form of connecting member or link 18ª, wherein the connecting member or link is designed to engage with or receive but one side of a pair of the adjacent stay-sheet heads, and the connecting member or link is adapted to extend longitudinally of the water-leg as very clearly illustrated in Fig. 8. In this construction the connecting members or links 18ª are provided with a recess 19ª at each end thereof; the recessed ends being adapted to extend or take about the edges of the head portions of the stay-members or sheets arranged at opposite sides of the different sections or units 17, as clearly indicated in Fig. 8. The connecting members or links 18ª are preferably provided with the two spacing portions or plates 20ᵇ, which I prefer to arrange at the ends of the connecting members or links, as clearly shown in Fig. 9, so that the spacing portions or plates 20ᵇ will engage with the enlarged end portions of the succeeding connecting member or link immediately beneath, whereby a water circulating space between the different connecting members will be maintained.

Figs. 11, 12, and 13, show another modified form of my invention, wherein the stay sheet or member 14ª is provided with a head 15ᵇ, the sides or ends of the head being provided with the projecting lip portions 15ᶜ presented or curved backwardly as very clearly shown in Fig. 11. In these figures I show the connecting member or link adapted to engage with but one side of a pair of oppositely disposed stay sheets, so that two connecting members or links are used for each pair of stay sheets, as very clearly shown in Fig. 11. The staying members or links 18ᵇ are provided with curved lips 19ᵇ presented toward each other so as to interlock with the lips 15ᶜ of the oppositely disposed head of the stay sheets or members 14ª. Preferably at a point intermediate of its sides, the connecting member or link 18ᵇ is provided with the depending spacing portion or plate 20ᶜ, which is adapted to engage with the succeeding connecting member or link immediately beneath, whereby a proper water circulating space between the different connecting members or links will be maintained; it being understood, of course, that the spacing portion or plate 20ᶜ corresponds in length with the distance between the respective heads on the stay sheets or members 14ª.

It has been found in practice, that the heating surface of the firebox and combustion chamber of a boiler is approximately eight times more efficient than that of the flues of the boiler, so that any increase in the firebox or combustion chamber heating surface would result in a more efficient boiler. It is evident, therefore, that the firebox and combustion chamber heating surface of a locomotive boiler may be greatly increased by dividing the firebox and combustion chamber longitudinally in the manner illustrated in Figs. 1, 2, and 3, thereby providing an inside or intermediate water-leg, exposed to the fire and hot gases on both sides; the water-leg being situated between the two furnace portions and the two combustion chambers, as very clearly shown. Where these water-legs are formed by walls constructed of flat plates, stayed by means of the usual stay bolts, a construction commonly used in building fireboxes, the cost of maintenance, by reason of the exposure of the stay bolts to the hot gases and fire, is increased to such an extent as to more than outweigh the benefits that might be derived, because of the multiplication of the stay bolt troubles and the bad effect of expansion and contraction; such a construction having other disadvantages inherent in the stay bolt principles of firebox construction. These troubles and disadvantages, however, are not encountered in the Jacobs-Shupert sectional principle of firebox nor in the Jacobs self-supporting sectional combustion chamber; however, with these constructions wherein the flanges of the sections of both of the walls extend inwardly, that is into the water chamber or space, it has been found practically impossible to rivet the stay sheets because of the lack of space between the flanges of the sections, thereby precluding the insertion of any device suitable to drive the rivets, because the principle involved in the sectional constructions referred to suggest the presentation of the flanges of the sections into the water-leg in order that no rivets will be exposed to the fire or hot gases. It has, therefore, become necessary to devise some means, as herein described, whereby the stay sheets could be riveted between the furnace sections and combustion chamber sections before the furnace and combustion chambers were connected to each other.

The herein described invention also makes it possible to use sectional heads for combustion chambers which will be properly stayed and at the same time be entirely free of stay bolts; further, making it possible to employ a separate sectional combustion chamber for each furnace, so that each furnace will be independent of the other, and the draft, by reason of the opening of the door of the one, will not be interfered with through the opening of the fire-door of the other furnace.

It is apparent, therefore, that my invention is also well adapted for use in connection with large marine boilers wherein it is necessary to equip the same with a plurality of furnaces at each end, as otherwise the grate area would be too large, making it difficult to support the crown of the furnace, and also losing the benefit of the added heating surface resulting from the intermediate or inside water-leg construction.

The invention has been shown embodied in a locomotive type of steam boiler of the sectional furnace and sectional combustion chamber design, but it will be understood that the invention may be employed in a great variety of structures, such as tanks, or receptacles of any kind which are subject to internal pressure; or to any type of boiler having walls of different sections or units, which walls form a chamber or chambers and are subject to internal pressure.

I have shown and described what I believe to be the simplest and best forms of my invention, but the same may be modified in certain respects without, however, departing from the spirit of my invention, and I do not wish to be understood, therefore, as limiting myself to the exact constructions shown and described.

What I claim is:—

1. Means of the class described, comprising members adapted to be secured to the opposing walls to be stayed and having outwardly presented portions, a second member adapted to be slipped onto the outwardly presented portions of the first mentioned and opposing members, both sets of members being provided with interlocking surfaces whereby lateral movement is prevented, and means whereby a spaced relation between a multiple of the second members is maintained.

2. Means of the class described, comprising means adapted to be secured to the opposing walls to be stayed, said means being provided with protruding portions, and linking means adapted to engage with the protruding portions of the first mentioned means so as to prevent lateral movement.

3. Means of the class described, comprising stay-sheet members adapted to be secured to the opposing walls to be stayed, said stay-sheet members being provided with protruding portions, and means adapted to engage with the protruding portions of oppositely disposed stay-sheet members whereby transverse movement is prevented, said last mentioned means being so formed as to maintain the proper relative position thereof.

4. Means of the class described, comprising stay-sheet members adapted to be secured to the opposing walls to be stayed, said stay-sheet members being provided with protruding portions, and linking means provided with surfaces adapted to engage with the protruding portions of oppositely disposed stay-sheet members to prevent lateral movement and with surfaces whereby a proper spaced relation will be maintained between the stay-sheet engaging portions of said means.

5. Means of the class described, comprising a stay-sheet member provided with water circulating portions and with protruding head portions, and a link member provided with surfaces adapted to engage with the head portions of the stay-sheet member and prevent lateral movement.

6. Means of the class described, comprising means adapted to be secured to the opposing walls to be stayed, said means being provided with protruding portions, and means provided with sockets adapted to receive the protruding portions of the first mentioned means whereby lateral movement is prevented, the means being formed so as to provide circulating spaces.

7. Means of the class described, comprising stay-sheet members adapted to be secured to opposing walls so as to have the free edges of the opposing members presented toward each other, and link members provided with surfaces adapted to engage with the free edges of the stay-sheet members and prevent lateral displacement, said link members being arranged to become disengaged by movement lengthwise of the stay-sheet members.

8. In a boiler provided with an inside water-leg composed of sectional side walls, stay-sheet members adapted to be secured intermediate of the respective sections of the opposing walls so as to provide oppositely presented portions, means adapted to interlock with the oppositely presented portions of the stay-sheet members so as to prevent lateral displacement, and means for securing said first mentioned means in proper relative position against vertical displacement.

9. In a boiler provided with an inside water-leg composed of sectional side walls, stay-sheet members adapted to be secured intermediate of the respective sections of the opposing walls, said members being provided with alternating water-circulating passages and protruding head-portions arranged lengthwise of one edge of said members, and means adapted to be arranged intermediate of the opposing walls of the water-leg and engage said protruding head-portions so as to maintain the relative position laterally of the opposing walls, said means being formed so as to provide circulating spaces.

FRANK M. JACOBS.

Witnesses:
R. S. NORTHRUP,
FERNE BUNKER.

---

Copies of this patent may be obtained for five cents each, by addressing the "Commissioner of Patents, Washington, D. C."